United States Patent
Rondeau et al.

(10) Patent No.: US 12,010,605 B2
(45) Date of Patent: Jun. 11, 2024

(54) ROUTING METHOD AND DEVICE IMPLEMENTING SAID METHOD

(71) Applicant: Airbus SAS, Blagnac (FR)

(72) Inventors: Jean-Loup Rondeau, Blagnac (FR); Laurent Fichot, Blagnac (FR); Albekaye Traore, Blagnac (FR); Farouk Mezghani, Blagnac (FR)

(73) Assignee: AIRBUS SAS, Blagnac (FR)

( * ) Notice: Subject to any disclaimer, the term of this patent is extended or adjusted under 35 U.S.C. 154(b) by 32 days.

(21) Appl. No.: 17/824,112

(22) Filed: May 25, 2022

(65) Prior Publication Data

US 2022/0386217 A1     Dec. 1, 2022

(30) Foreign Application Priority Data

May 28, 2021  (FR) ...................................... 2105586

(51) Int. Cl.
| | | |
|---|---|---|
| *H04L 45/76* | (2022.01) | |
| *H04L 45/00* | (2022.01) | |
| *H04L 45/02* | (2022.01) | |
| *H04W 40/12* | (2009.01) | |
| *H04W 40/20* | (2009.01) | |

(52) U.S. Cl.
CPC ............. *H04W 40/20* (2013.01); *H04L 45/08* (2013.01); *H04L 45/14* (2013.01); *H04L 45/76* (2022.05); *H04W 40/12* (2013.01)

(58) Field of Classification Search
CPC ...... H04W 40/20; H04W 40/12; H04L 45/08; H04L 45/14; H04L 45/76; H04L 45/12
USPC .................. 709/220, 224, 226, 228
See application file for complete search history.

(56) References Cited

U.S. PATENT DOCUMENTS

| | | | | |
|---|---|---|---|---|
| 9,584,946 | B1 * | 2/2017 | Lyren ........................ | H04S 7/30 |
| 10,887,808 | B1 * | 1/2021 | McPhee ................ | H04W 16/14 |
| 11,463,365 | B1 * | 10/2022 | Vasseur ................. | H04L 47/122 |

(Continued)

FOREIGN PATENT DOCUMENTS

| | | | | |
|---|---|---|---|---|
| AU | 2007247958 A1 * | 12/2008 | ............. | G05B 15/00 |
| EP | 2023685 A1 | 2/2009 | | |
| WO | 2018211488 A1 | 11/2018 | | |

OTHER PUBLICATIONS

French Search Report; priority document.

*Primary Examiner* — Khanh Q Dinh
(74) *Attorney, Agent, or Firm* — Greer, Burns & Crain, Ltd.

(57) ABSTRACT

A routing method for routing an application data stream from a routing device in a vehicle to a receiving device. The routing device has available to it a plurality of communication arrangements. Before a movement of the vehicle, at least one parameter representative of the performance is estimated along a planned itinerary for each communication arrangement. Theoretical routing rules are then defined based on the estimated parameters and application requirements. During the movement of the vehicle, at least one parameter representative of the performance is estimated for each communication arrangement. The application stream is then routed by using routing rules determined in response to a comparison between the parameters representative of the performance estimated before movement and the corresponding parameters estimated during the movement.

10 Claims, 4 Drawing Sheets

(56) References Cited

U.S. PATENT DOCUMENTS

| | | | |
|---|---|---|---|
| 2002/0068584 A1* | 6/2002 | Gage | H04L 61/4557 |
| | | | 455/445 |
| 2010/0232295 A1 | 9/2010 | True et al. | |
| 2011/0136488 A1* | 6/2011 | Kuvvali | H04L 67/568 |
| | | | 455/436 |
| 2014/0044107 A1* | 2/2014 | Jacob | H04L 25/03006 |
| | | | 370/336 |
| 2015/0215738 A1* | 7/2015 | Frusina | H04N 21/238 |
| | | | 455/552.1 |
| 2018/0139565 A1* | 5/2018 | Norris | H04S 1/007 |
| 2018/0376384 A1* | 12/2018 | Youn | H04W 92/02 |
| 2018/0376444 A1* | 12/2018 | Kim | H04W 36/0022 |
| 2019/0029065 A1* | 1/2019 | Park | H04W 8/08 |
| 2019/0373441 A1* | 12/2019 | Ryu | H04W 48/18 |
| 2020/0067341 A1* | 2/2020 | Glover | H02J 50/80 |
| 2020/0178343 A1* | 6/2020 | Kim | H04W 76/27 |
| 2020/0389383 A1* | 12/2020 | Vasseur | H04L 43/0847 |
| 2021/0114616 A1 | 4/2021 | Altman | |
| 2021/0211960 A1* | 7/2021 | Ryu | H04W 36/0011 |

* cited by examiner

ROUTING METHOD AND DEVICE IMPLEMENTING SAID METHOD

CROSS-REFERENCES TO RELATED APPLICATIONS

This application claims the benefit of the French patent application No. 2105586 filed on May 28, 2021, the entire disclosures of which are incorporated herein by way of reference.

FIELD OF THE INVENTION

At least one embodiment relates to a routing method for routing an application data stream from a routing device situated in a vehicle to a receiving device, the routing device having available to it a plurality of communication means. A routing device implementing the routing method is also described.

BACKGROUND OF THE INVENTION

SD-WAN (the acronym for "Software-Defined Wide Area Network"), a new approach that has recently emerged, applies the principles of a software-defined network architecture (or "Software defined networking") to WANs (WAN being the acronym for "Wide Area Network").

In an SD-WAN network, traffic and quality of service are managed directly at the application level (level 7 of the OSI (acronym for "Open System Interconnexion") model) according to requirements. To this end, the application data streams are classified by type of application. Once this classification has been made, each application stream is routed according to dynamic performance criteria (e.g., latency, jitter, packet loss ratio, etc.). The SD-WAN network thus makes it possible to route the most critical or most bandwidth-intensive applications according to predefined routing rules and thus improve the experience of the user. The set of these predefined routing rules forms a smart routing policy. These routing rules are generally fixed. While they are suited to fixed terrestrial networks (or "landline networks"), they do not make it possible to satisfactorily address the requirements of the mobile environments.

Indeed, in a mobile environment, many problems associated with the movement of the object itself, as well as the variability of the coverages of the communication means, arise. They are notably due to the strong variations of capabilities of the communication means, such as, for example, the disturbances from electromagnetic waves, or even the loss of certain communication links (masking, leaving coverage, etc.). Consequently, the application of the fixed routing rules, while it allows adequate management of a fixed terrestrial SD-WAN network does not make it possible to ensure a level of service that is expected in mobility situations.

It is desirable to migrate these various drawbacks of the state of the art. It is notably desirable to propose a dynamic routing method suited to the mobile environments.

SUMMARY OF THE INVENTION

A routing method for routing an application data stream from a routing device in a vehicle to a receiving device is described. The routing device has available to it a plurality of communication means. The routing method comprises the following steps implemented by the routing device:
before a movement of the vehicle:
obtaining information relating to the movement, the information comprising at least one planned itinerary for the movement and, for each communication means, information necessary to the estimation of at least one parameter representative of the performance of the communication means;
estimating, by using a machine learning method, along the planned itinerary, for each communication means, the parameter representative of the performance of the communication means based on the information obtained;
defining theoretical routing rules based on the estimated parameter representative of the performance of the communication means and application requirements;
during the movement of the vehicle:
obtaining information relating to the movement, the information comprising at least vehicle position information at an instant t;
obtaining, for each communication means, information determined at instants prior to the instant t and necessary to the estimation of the parameter representative of the performance at the instant t of the communication means;
estimating, by using a machine learning method, for each communication means, the parameter representative of the performance at the instant t of the communication means based on the information obtained during the movement;
comparing, for each communication means, the parameter representative of the performance of the communication means estimated at the instant t with its value estimated before the movement;
routing the application data stream in response to the comparison.

The method advantageously makes it possible to adapt the routing rules dynamically by taking account of the performance levels of each of the communication means, performance levels which, in a mobility context, change over time, and of the application requirements.

According to a particular embodiment, before the movement of the vehicle, the information necessary to the estimation of at least one parameter representative of the performance of the communication means comprises map data indicating the level of coverage of the communication means.

According to a particular embodiment, routing the application data stream in response to the comparison comprises:
routing the application data stream by using the theoretical routing rules in the case where, for all the communication means, all the estimated parameters representative of the performance at the instant t of the communication means are substantially equal to their respective values estimated before movement;
otherwise, defining new routing rules based on the estimated parameters representative of the performance at the instant t of the communication means and on the application requirements, and routing the application data stream by using the new routing rules.

According to a particular embodiment, the at least one parameter representative of the performance of the communication means belongs to the set of parameters comprising a bit rate, a latency, a packet loss ratio, a jitter.

According to a particular embodiment, the routing device is an SD-WAN routing device.

A routing device in a vehicle configured to route an application data stream from the vehicle to a receiving device is described. The routing device has available to it a plurality of communication means and it comprises at least one processor configured to:

before a movement of the vehicle:
obtain information relating to the movement, the information comprising at least one planned itinerary for the movement and, for each communication means, information necessary to the estimation of at least one parameter representative of the performance of the communication means;
estimate, by using a machine learning method, along the planned itinerary, for each communication means, at least one parameter representative of the performance of the communication means based on the information obtained;
define theoretical routing rules based on the estimated parameter representative of the performance of the communication means and application requirements;

during the movement of the vehicle:
obtain information relating to the movement, the information comprising at least vehicle position information at an instant t;
obtain, for each communication means, information obtained at instants prior to the instant t and necessary to the estimation of at least one parameter representative of the performance at the instant t of the communication means;
estimate, by using a machine learning method, for each communication means, the parameter representative of the performance of the communication means at the instant t based on the information obtained during the movement;
compare, for each communication means, the parameter representative of the performance of the communication means estimated at the instant t with its value estimated before the movement;
route the application data stream in response to the comparison.

According to a particular embodiment of the routing device, before the movement of the vehicle, the information necessary to the estimation of at least one parameter representative of the performance of the communication means comprises map data indicating the level of coverage of the communication means.

According to a particular embodiment of the routing device, to route the application data stream in response to the comparison, the processor is configured to:
route the application data stream using the theoretical routing rules in the case where, for all the communication means, all the estimated parameters representative of the performance at the instant t of the communication means are substantially equal to their respective values estimated before movement;
otherwise, define new routing rules based on the estimated parameters representative of the performance at the instant t of the communication means and on the application requirements and route the application data stream by using the new routing rules.

According to a particular embodiment of the routing device, the at least one parameter representative of the performance of the communication means belongs to the set of the parameters comprising a bit rate, a latency, a packet loss ratio, a jitter.

According to a particular embodiment of the routing device, the routing device is an SD-WAN routing device.

An aircraft comprising a routing device according to one of the preceding embodiments is also described.

A computer program product is described which comprises instructions for implementing the routing method according to one of the preceding embodiments, when the computer program is run by a processor.

A storage medium is described which stores a computer program comprising instructions for implementing the routing method according to one of the preceding embodiments, when the computer program is run by a processor.

BRIEF DESCRIPTION OF THE DRAWINGS

The features of the invention mentioned above, and others, will emerge more clearly on reading the following description of an exemplary embodiment, the description being given in relation to the attached drawings, in which.

DETAILED DESCRIPTION OF THE PREFERRED EMBODIMENTS

The invention is described in a mobility context. In this context, application data streams have to be routed from a vehicle that is moving to a destination. The invention is more particularly described in the case where the vehicle is an aircraft. It applies likewise to any type of vehicle, e.g., a helicopter, a bus, a car, a train, a boat, etc.

Figure 1:
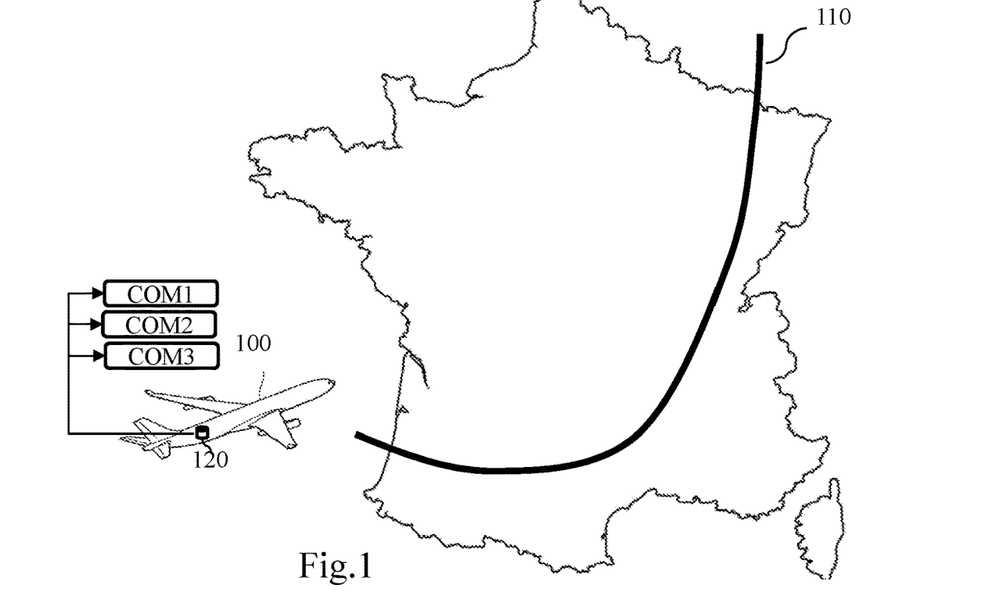
FIG. 1 illustrates an aircraft equipped with a routing device moving along a flight itinerary.

FIG. 1 illustrates a vehicle, in this case an aircraft 100, moving along an itinerary, in this case a flight itinerary 110 (or "flight route"). In the aircraft 100, passengers or crew members can use different applications, such as instant messaging applications, photo and video sharing applications, applications hosting videos and music, game applications, professional applications, etc. Each of these applications generates one or more data streams that have to be routed to a destination. To this end, the aircraft 100 is equipped with a routing device 120. According to one configuration, the routing device 120 is an element of a network of SD-WAN type. It has available to it a plurality of communication means COMj, j∈{1, 2, ... N}, where N is a positive integer greater than or equal to 2, to route each data stream to its destination. For example, the routing device 120 can route the data streams by using 4G communication means, 5G communication means, LEO ("Low Earth Orbit"), GEO ("GEostationary Orbit") or even MEO ("Medium Earth Orbit") satellites. The routing device 120 is therefore configured to dynamically select, for each data stream, during a flight or more generally during a movement of the vehicle, the most relevant routing path out of the paths offered by the different communication means available and thus enhance the experience of the user and the performance levels of the applications.

Figure 2A:
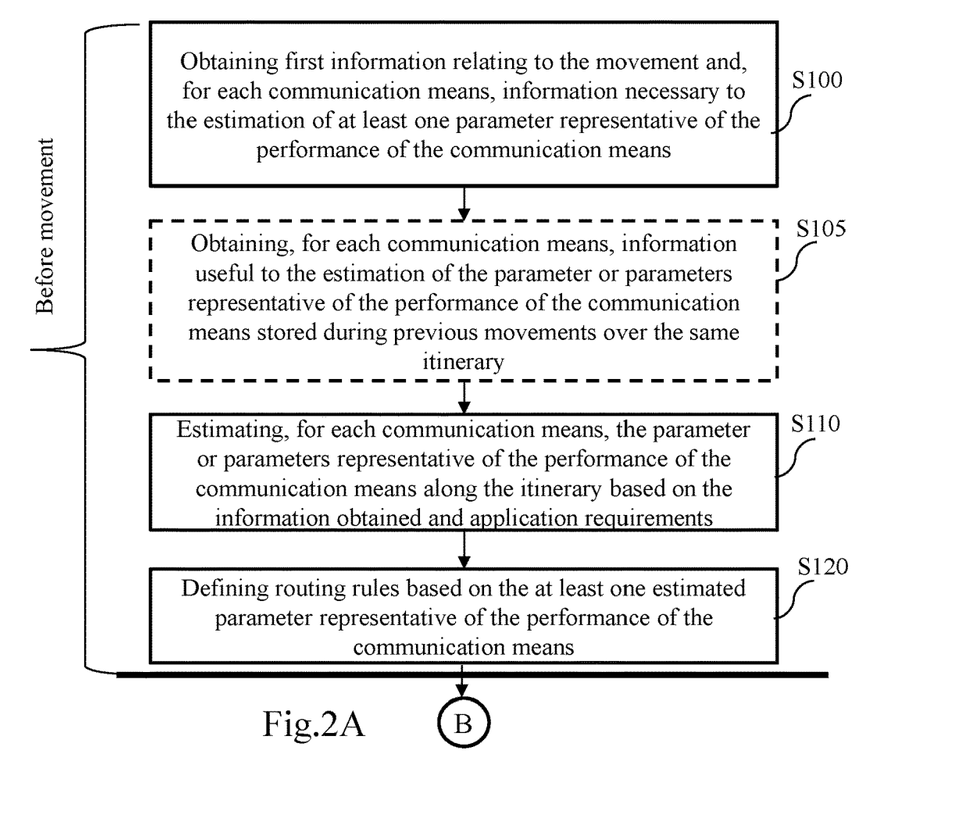
FIG. 2A schematically illustrates a first part of an application data stream routing method according to a particular embodiment.
Figure 2B:
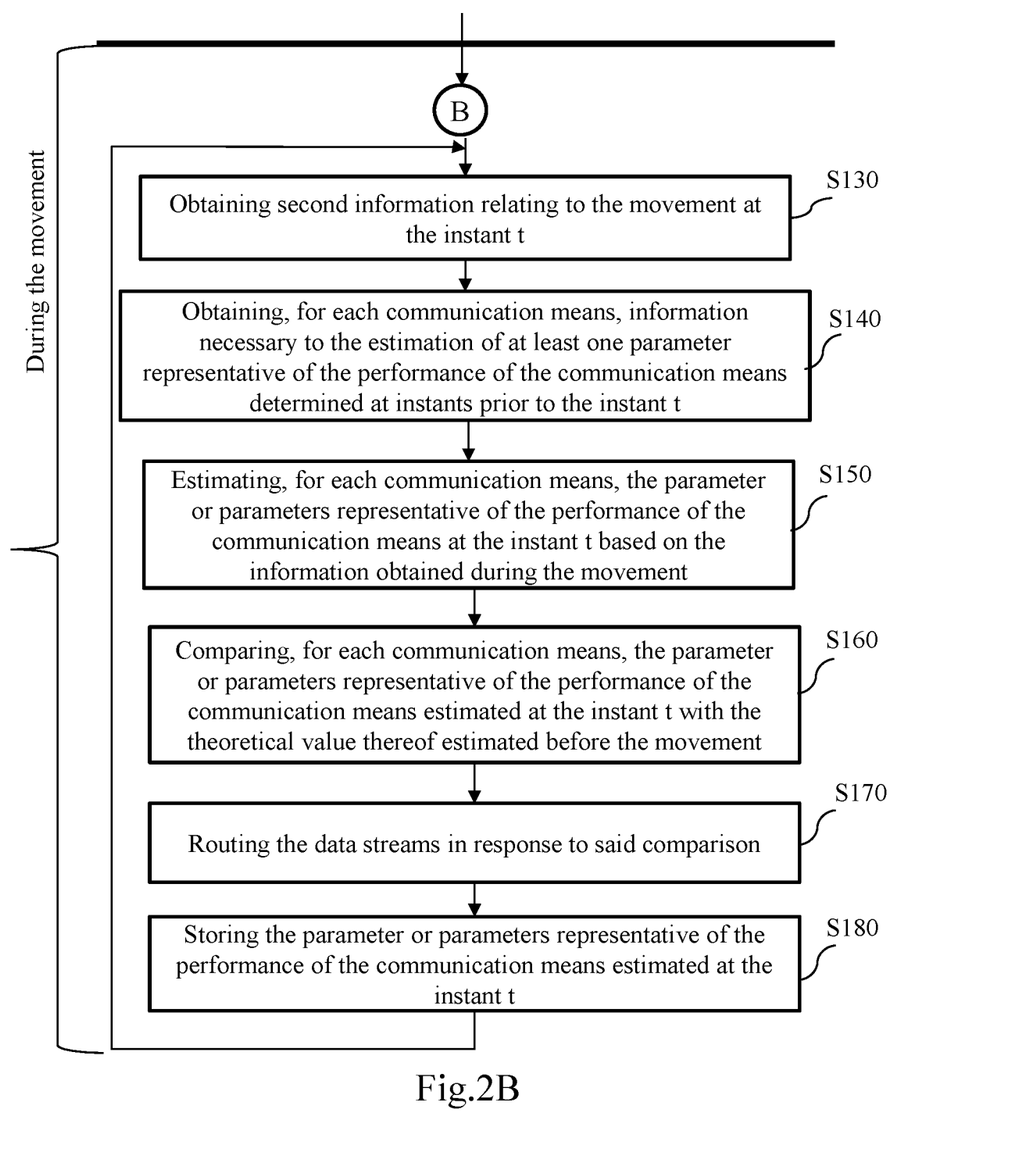
FIG. 2B schematically illustrates a second part of the application data stream routing method according to a particular embodiment.

FIGS. 2A and 2B schematically illustrate an application data stream routing method according to a particular embodiment. The routing method is, for example, implemented by a routing device, e.g., the routing device 120, having available to it a plurality of communication means $COM_j$, $j \in \{1, 2, \ldots N\}$ for routing the application data streams.

In a step S100, the routing device 120 obtains, before the movement of the vehicle, first information relating to the movement, the information comprising at least one planned itinerary 110 for the movement and, for each communication means available, information necessary to the estimation of at least one parameter representative of the performance of the communication means over the planned itinerary. In a particular embodiment, the parameter representative of the performance of the communication means is a bit rate. In variant embodiments, the parameter representative of the performance of the communication means is a latency, a jitter, or a packet loss ratio. In another variant, the information necessary to the estimation of parameters representative of the performance of the communication means makes it possible to estimate a plurality of parameters.

In the particular case of an aircraft, the itinerary is a flight itinerary which is obtained from a flight plan. In the case of a car or a bus, the itinerary can be obtained from a map database in which the point of departure, the point of arrival and any intermediate steps will have been specified. The itinerary is generally defined as a succession of positions, each position being defined by a latitude value and a longitude value. In the case of flying vehicles, an altitude value is used in addition to the latitude and longitude values to define a position.

For a given communication means, the information necessary to the estimation of at least one parameter representative of the performance of the communication means comprises, for example, the position of the communication means, a map indicating a level of coverage of the communication means, e.g., the received signal strength, and/or a pointing of an antenna, a theoretical bandwidth, etc. For example, in the case of GEO satellites, it is possible to determine a bit rate on the planned itinerary on the basis of coverage maps of the satellites. For example, the map data of a coverage indicates, for each position (latitude, longitude, altitude) of a terrestrial zone, the value of the signal-to-noise ratio. For a given communication means, the information necessary to the estimation of at least one parameter representative of the performance of the communication means combines quality indicators (e.g., indicators of RF (Radio Frequency) or network quality) and map data of the communication means.

In a step S110, for each communication means, the parameter or parameters representative of the performance of the communication means is or are estimated along the itinerary, i.e., notably at each planned position of the vehicle along this itinerary, based on the information obtained in the step S100. To this end, a machine learning method is advantageously used.

Figure 3:
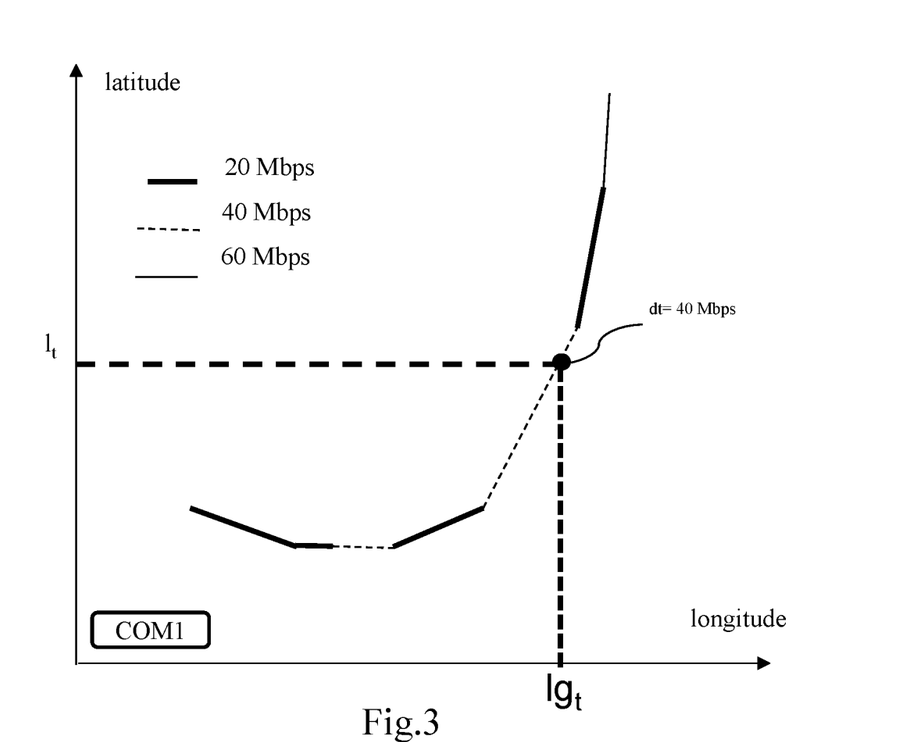
FIG. 3 represents a theoretical bit rate estimated along the flight itinerary of an aircraft.

The learning method is for example based on SVM (the acronym for "Support Vector Machine"), on k nearest neighbors, on a decision tree, on Markov decision processes. FIG. 3 illustrates the particular case in which the parameter representative of the performance of the communication means COM1 is a bit rate. Thus, in FIG. 3, a bit rate value is estimated for each position of the aircraft 100 planned along the flight itinerary. In this figure, there are 7 segments, each of which has an associated bitrate of 20, 40 or 60 Mbps. Thus, for each position of the aircraft, i.e., longitude, latitude (the altitude is not represented in FIG. 3), there is a corresponding theoretical bit rate value associated with the communication means COM1.

In a variant embodiment, in an optional step S105, information useful to the estimation of the parameter or parameters representative of the performance of the communication means stored during previous movements over the same itinerary or over near itineraries is obtained for each communication means, and, for example, it is read in a database DB1. The useful information comprises, for example, the parameter or parameters representative of the performance of the communication means stored during previous movements over the same itinerary, such as, for example, latency, packet loss ratio and jitter values, signal-to-noise ratio values, or else other parameters characteristic of the communication means such as a modulation type, a Doppler shift measurement, etc.

Thus, in a variant embodiment of the step S110, for each communication means, the parameter or parameters representative of the performance of the communication means is or are estimated over the itinerary, i.e., notably at each planned position of the vehicle on this itinerary, based on the information obtained in the step S100 and on the information obtained in the step S105. The values of the parameters which are estimated are so-called theoretical values in as much as they are determined before the departure of the vehicle. Using such additional information makes it possible to improve the machine learning method, in particular the accuracy thereof.

In a step S120, the routing device 120 defines, before the movement, so-called theoretical routing rules, based on the parameter or parameters representative of the performance of the communication means estimated over the itinerary in the step S110 and on the requirements of each application associated with these parameters, e.g., their requirements in terms of bit rate, of latency, of tolerance to packet losses.

For example, for each portion of itinerary, a portion for example corresponding to a segment as defined in FIG. 3, the application data streams transporting voice are routed by using the communication means offering the lowest latency or jitter. The application data streams transporting video are routed using the communication means offering the highest bit rate. The application data streams transporting critical data are routed using the communication means offering the lowest loss ratio.

For example, these routing rules indicate, for a first portion of itinerary, e.g., the first segment of FIG. 3, that the application data streams associated with instant messaging applications or with photo and video sharing applications are routed by using, preferably, the first communication means COM1, the data streams associated with applications hosting videos are routed, preferably, by using the first communication means COM2 and the data streams associated with game applications are routed, preferably, by using the first communication means COM3. The theoretical routing rules are adapted dynamically according to the variations along the itinerary of the parameter or parameters representative of the performance of the communication means. These routing rules include the possibility of blocking certain application to avoid the creation of a bottleneck in the case where, for example, a strong bit rate reduction is identified.

This step of defining theoretical routing rules is performed just once before the departure of the vehicle.

In a step S130, the routing device 120 obtains, during the movement of the vehicle, second information relating to the movement at an instant t, the second information comprising at least position information at the instant t, e.g., GPS coordinates of the vehicle. This information can also comprise information on speed of movement of the vehicle at the instant t. If the vehicle is an aircraft, this information can also comprise values at the instant t of yaw, of roll, and of pitch of the aircraft. These data make it possible, for example, to determine whether the itinerary actually followed by the vehicle is or is not identical to the planned itinerary.

In a step S140, for each communication means, information necessary to the estimation of the parameter or parameters representative of the performance of the communication means is obtained, for example, read from a database, in which it will have been previously stored. Such information includes values of the parameter or parameters representative of the performance of the communication means estimated at instants prior to the instant t and stored in the database DB2. The information necessary to the estimation of the parameter or parameters representative of the performance of the communication means stored for example includes latency, packet loss ratio and jitter values, signal-to-noise ratio values, etc.

In a step S150, for each communication means, the parameter or parameters representative of the performance of the communication means is or are estimated at the instant t based on the information obtained in the steps S130 and S140. To this end, a machine learning method is advantageously used. The learning method is for example based on SVM (the acronym for "Support Vector Machine"), on k nearest neighbors, on a decision tree, on Markov decision processes. To this end, the same machine learning method is used as that used in the step S110.

In a particular embodiment, the parameter representative of the performance of the communication means COMj is an instantaneous bit rate Dt[COMj] estimated on the basis of the information obtained in the steps S130 and S140.

In a step S160, for each communication means COMj, the parameter or parameters representative of the performance of the communication means estimated at the instant t in the step S130 is or are compared to the same parameter estimated before the movement in the step S110.

In the particular example in which the parameter concerned is a bit rate, the instantaneous bit rate Dt[COMj] estimated at the instant t is compared to the theoretical bit rate dt[COMj] estimated in the step S110. For example with reference to FIG. 3, at the instant t, the aircraft is at latitude lt and at longitudinal lgt, and then the theoretical bit rate for the communication means COM1 is dt[COM1]=40 Mbps. It is this value which is compared to the value Dt[COMj].

In a step S170, each data stream is routed in response to the comparisons performed in the step S160. If, for all the communication means COMj, $j \in \{1, 2, \ldots N\}$, all the parameters (e.g., bit rate, jitter, latency) representative of the performance at the instant t of the communication means and which have been estimated in the step S130 are equal to within c to their respective values estimated before movement in the step S110 (c being a tolerance value which defines a deviation around the respective value estimated before movement, and which is considered negligible), then the theoretical routing rules defined in the step S120 are used to route the application data streams, otherwise new routing rules are defined and it is these new routing rules which are used to route the application data streams.

The new routing rules are defined on the basis of the estimated parameters representative of the performance at the instant t of the communication means and on application requirements of each application associated with these parameters, e.g., their requirements in terms of bit rate, of latency, of tolerance to packet losses. These new routing rules are defined in the same way as the theoretical routing rules but taking into account the parameter or parameters (e.g., bit rate, jitter, latency, packet loss ratio) representative of the performance estimated in the step S130.

In the particular example in which the parameter concerned is a bit rate, if, for at least one of the means COMj, $j \in \{1, 2, \ldots N\}$, $|Dt[COMj]-dt[COMj]| \geq \varepsilon$, then new routing rules are defined. The new routing rules are used to route the data streams originating from the various applications.

Otherwise, i.e., in the case in which, for all the communication means COMj, $j \in \{1, 2, \ldots N\}$, $|Dt[COMj]-dt[COMj]| < \varepsilon$, then the theoretical routing rules defined in the step S120 are used to route the data streams as originating from the various applications.

In a step S180, for each communication means COMj, the parameter or parameters representative of the performance of the communication means estimated at the instant t in the step S130 is or are stored in memory, e.g., in the databases DB1 and DB2. These parameters will be able to be used as additional data in a step S110 for future flights over the same itinerary. They are also used during the current flight to estimate, in the step S150, parameters representative of the performance of the communication means at instants after t.

Figure 4:
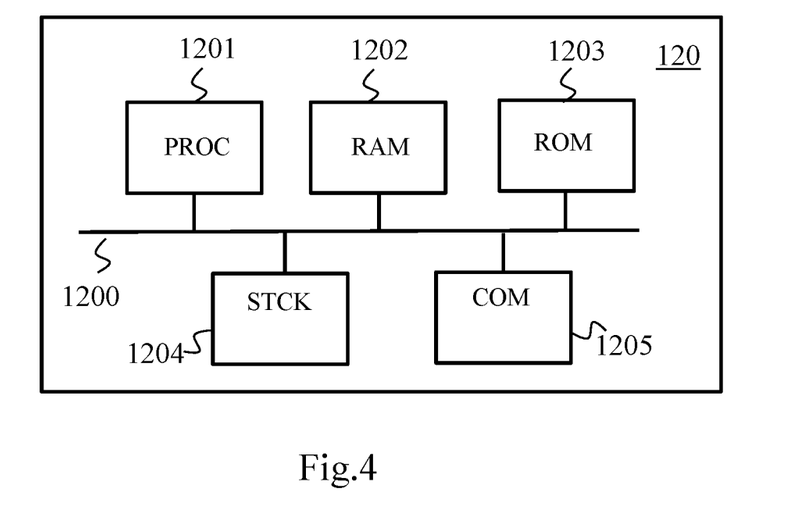
FIG. 4 schematically illustrates an example of hardware architecture of a routing device according to a particular embodiment.

FIG. 4 schematically illustrates an example of hardware architecture of a routing device 120 according to a particular embodiment.

According to the hardware architecture example represented in FIG. 4, the routing device 120 then comprises, linked by a communication bus 1200: a processor or CPU (Central Processing Unit) 1201; a random access memory RAM 1202; a Read Only Memory ROM 1203; a storage unit 1204 such as a hard disc or such as a storage medium reader, e.g., an SD (Secure Digital) card reader, at least one communication interface 1205 allowing the routing device 120 to send or receive information.

The processor 1201 is capable of executing instructions loaded into the RAM 1202 from the ROM 1203, from an external memory (not represented), from a storage medium (such as an SD card), or from a communication network. When the routing device 120 is powered up, the processor 1201 is capable of reading instructions from the RAM 1202 and of executing them. These instructions form a computer program causing the implementation, by the processor 1201, of all or part of the methods described in relation to FIGS. 2A and 2B.

The method described in relation to FIGS. 2A and 2B can be implemented in software form by the execution of a set of instructions by a programmable machine, for example a DSP (Digital Signal Processor) or a microcontroller, or be implemented in hardware form by a machine or a dedicated component, for example an FPGA (Field-Programmable Gate Array) or an ASIC (Application-Specific Integrated Circuit). Generally, the routing device 120 comprises electronic circuitry configured to implement the method described in relation to FIGS. 2A and 2B.

Figure 5:
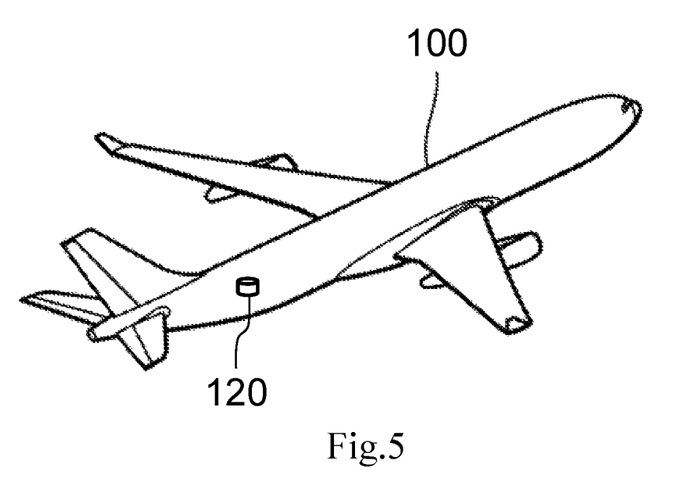
FIG. 5 shows a perspective view of an aircraft which comprises a routing device according to a particular embodiment.

FIG. 5 shows a perspective view of an aircraft 100 which comprises a routing device 120. The routing device 120 is configured to implement the method described with reference to FIGS. 2A and 2B.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A routing method for routing an application data stream from a routing device in a vehicle to a receiving device, said routing device having available to it a plurality of communication means, wherein said method comprises the following steps, implemented by said routing device:
    before a movement of said vehicle:
        obtaining information relating to said movement, said information comprising at least one planned itinerary for said movement and, for each of said plurality of communication means, information necessary to an estimation of at least one parameter representative of a performance of the communication means;
        estimating, by using a machine learning method, along the planned itinerary, for each communication means, said at least one parameter representative of the performance of said communication means based on said information obtained;
        defining theoretical routing rules prior to the departure of the vehicle based on the estimated parameter representative of the performance of the communication means and application requirements;
    during the movement of said vehicle:
        obtaining information relating to said movement, said information comprising at least vehicle position information at an instant t;
        obtaining, for each communication means, information determined at instants prior to the instant t and necessary to the estimating of the parameter representative of the performance at the instant t of the communication means;
        estimating, by using a machine learning method, for each communication means, said parameter representative of the performance at the instant t of the communication means based on the information obtained during the movement;
        comparing, for each communication means, the parameter representative of the performance of the communication means estimated at the instant t with its value estimated before the movement;
        routing said application data stream in response to said comparing, wherein the application data stream is routed using said theoretical routing rules where, for all the communication means, all the estimated parameters representative of the performance at the instant t of the communication means are substantially equal to their respective values estimated before movement, otherwise, defining new routing rules based on the estimated parameters representative of the performance at the instant t of the communication means and on the application requirements, and routing the application data stream by using said new routing rules.

2. The routing method according to claim 1, wherein, before the movement of the vehicle, said information necessary to the estimation of at least one parameter representative of the performance of the communication means comprises map data indicating a level of coverage of said communication means.

3. The routing method according to claim 1, wherein said at least one parameter representative of the performance of said communication means belongs to a set of parameters comprising a bit rate, a latency, a packet loss ratio, and a jitter.

4. The routing method according to claim 1, wherein the routing device is an SD-WAN routing device.

5. A routing device in a vehicle configured to route an application data stream from said vehicle to a receiving device, said routing device having available to it a plurality of communication means, said routing device comprising at least one processor configured to:
    before a movement of said vehicle:
        obtain information relating to said movement, said information comprising at least one planned itinerary for said movement and, for each communication means, information necessary to an estimation of at least one parameter representative of the performance of the communication means;
        estimate, by using a machine learning method, along the planned itinerary, for each communication means, the at least one parameter representative of the performance of said communication means based on said information obtained;
        define theoretical routing rules prior to the departure of the vehicle based on the estimated parameter representative of the performance of the communication means and application requirements;
    during the movement of said vehicle:
        obtain information relating to said movement, said information comprising at least vehicle position information at an instant t;
        obtain, for each communication means, information obtained at instants prior to the instant t and necessary to the estimation of the at least one parameter representative of the performance at the instant t of the communication means;
        estimate, by using a machine learning method, for each communication means, said parameter representative of the performance of the communication means at the instant t based on the information obtained during the movement;
        compare, for each communication means, the parameter representative of the performance of the communication means estimated at the instant t with its value estimated before the movement;
        route said application data stream in response to said comparison, wherein the routing device routes the application data stream by using said theoretical routing rules where, for all the communication means, all the estimated parameters representative of the performance at the instant t of the communication means are substantially equal to their respective values estimated before movement, otherwise the routing device defines new routing rules based on the estimated parameters representative of the performance at the instant t of the communication means and on the application requirements and route the application data stream using said new routing rules.

6. A routing device according to claim 5, wherein, before the movement of the vehicle, said information necessary to the estimation of at least one parameter representative of the performance of the communication means comprises map data indicating a level of coverage of said communication means.

7. The routing device according to claim 5, wherein said at least one parameter representative of the performance of said communication means belongs to the set of the parameters comprising a bit rate, a latency, a packet loss ratio, a jitter.

8. The routing device according to claim 5, wherein the routing device is an SD-WAN routing device.

9. An aircraft comprising a routing device according to claim 5.

10. A non-transitory storage medium storing a computer program comprising instructions for implementing the routing method according to claim 1, when said computer program is run by a processor.

* * * * *